US008465286B2

(12) United States Patent
Sardari Lodriche et al.

(10) Patent No.: US 8,465,286 B2
(45) Date of Patent: Jun. 18, 2013

(54) LEARNING METHOD FOR CHEMICAL COMPOUND NOMENCLATURE

(76) Inventors: Soroush Sardari Lodriche, Tehran (IR); Shima Alsadaat Dianat, Tehran (IR)

(*) Notice: Subject to any disclaimer, the term of this patent is extended or adjusted under 35 U.S.C. 154(b) by 809 days.

(21) Appl. No.: 12/572,287

(22) Filed: Oct. 2, 2009

(65) Prior Publication Data

US 2011/0081638 A1 Apr. 7, 2011

(51) Int. Cl.
*G09B 19/22* (2006.01)
*G09B 23/24* (2006.01)

(52) U.S. Cl.
USPC ............................... 434/128; 434/298

(58) Field of Classification Search
USPC ............ 434/128, 129, 171, 172, 276, 280, 434/298; 273/236, 272, 273, 287, 288
See application file for complete search history.

(56) References Cited

U.S. PATENT DOCUMENTS

| | | | | |
|---|---|---|---|---|
| 2,492,563 A * | 12/1949 | Flickinger et al. | ............ | 273/236 |
| 3,423,093 A * | 1/1969 | Lahav | .................. | 273/282.1 |
| 3,594,923 A * | 7/1971 | Midgley | ................. | 434/298 |
| 3,804,417 A * | 4/1974 | Dawson | ................. | 273/243 |
| 5,071,132 A * | 12/1991 | Ward et al. | ............. | 273/243 |
| 5,553,853 A * | 9/1996 | Sackitey | ............... | 273/236 |
| 6,533,585 B2 * | 3/2003 | Possidento | ............ | 434/298 |
| D479,281 S * | 9/2003 | Hardwicke et al. | ...... | D21/367 |
| 7,490,834 B2 * | 2/2009 | Bauldock, Sr. | ........... | 273/273 |
| D605,234 S * | 12/2009 | Agbor | ................... | D21/478 |
| 7,955,083 B2 * | 6/2011 | Bush | ..................... | 434/280 |
| D654,959 S * | 2/2012 | Pulyassary et al. | ...... | D21/376 |
| 2006/0273507 A1 * | 12/2006 | Pelzel et al. | ........... | 273/236 |
| 2007/0170649 A1 * | 7/2007 | Collins | ................. | 273/292 |
| 2008/0284104 A1 * | 11/2008 | Samar | .................. | 273/302 |

* cited by examiner

*Primary Examiner* — Kurt Fernstrom

(74) *Attorney, Agent, or Firm* — Barry Choobin; Patent360 LLC

(57) ABSTRACT

An entertaining and educational apparatus is provided, comprising a first board and a second board. The first board, that is for beginners and intermediates has a plurality of colored spaces, each color stands for a concept in IUPAC nomenclature system. The second board that is for intermediates and advanced levels has 289 square spaces of equal dimensions, some spaces contain premium score.

5 Claims, 10 Drawing Sheets

| ✱ | | | | Double tile score | | | | Triple compound score |
|---|---|---|---|---|---|---|---|---|
| | Double tile score | | | | Double tile score | | | |
| | | Double tile score | | | | Double tile score | | |
| | | | Double tile score | | | | Double tile score | ← |
| Double tile score | | | Double compound score | | | | | Triple tile score |
| | Double tile score | | | Double compound score | | | | |
| | | Double tile score | | | Double compound score | | | |
| | | | Double tile score | | | | Double compound score | ← |
| | | | Triple tile score | | | | | Triple compound score |

FIG. 3

| Cis | 3 | 3 | 5 | three | methyl | cyclohex | ane | ol |
|---|---|---|---|---|---|---|---|---|
| 10 | 2 | 2 | 6 | 6 | 2 | 6 | 2 | 4 |

FIG. 5

| benzene | methyl | 2 | methoxy | 1 | prop | ene |
|---------|--------|---|---------|---|------|-----|
| 6 | 2 | 2 | 8 | 2 | 6 | 2 |

FIG. 7

| | | | cis 8 |
|---|---|---|---|
| | | | 1 2 |
| | | | 4 2 |
| | | | cyclohex 6 |
| | | | ane 2 |
| | | | di 4 |
| ethyl 8 | hex 6 | ane 2 | carboxylic acid₁₀ oate₈ |

FIG. 8A

LEARNING METHOD FOR CHEMICAL COMPOUND NOMENCLATURE

SPONSORSHIP STATEMENT

The present invention is sponsored by Iran National Science Foundation (INSF) for international filing.

FIELD OF THE INVENTION

The present invention pertains to the field of education and entertainment involving the formation of chemical compounds' name and apparatus for using the same.

BACKGROUND OF THE INVENTION

People, in particular, students, can learn in the context of educational tools. Using educational apparatus is usually more interesting than studying. Thus, if educational concepts can be put in the context of educational apparatus, and the use of them can be repeated over and over again, it will create an entertaining environment for learning. In particular, if educational tools are used between students, the exercise will support more interaction between them.

Further, strategy and problem solving are important skills to acquire for work purposes. These skills can also be learned in the context of educational tools. Additionally, such tools can be designed to be used in teams, thus fostering cooperation between participants.

Thus, it will be very beneficial to plan an educational tool, such as a chemical one, that can help students learn outside of a school setting, to help them progress or obtain skills and understanding, for example, in the fields of chemistry and science.

BRIEF DESCRIPTION OF FIGURES

Further objects of the present invention will become more readily apparent to those whom use the below description of the invention when taken in conjunction with the accompanying drawings, as follows:

FIG. 3 is a top plan view of the intermediates and advanced board.

FIG. 5 is a view of some tiles arranged on the board.

FIG. 7 is a view of some tiles arranged on the board.

SUMMARY OF THE INVENTION

Figure 1:
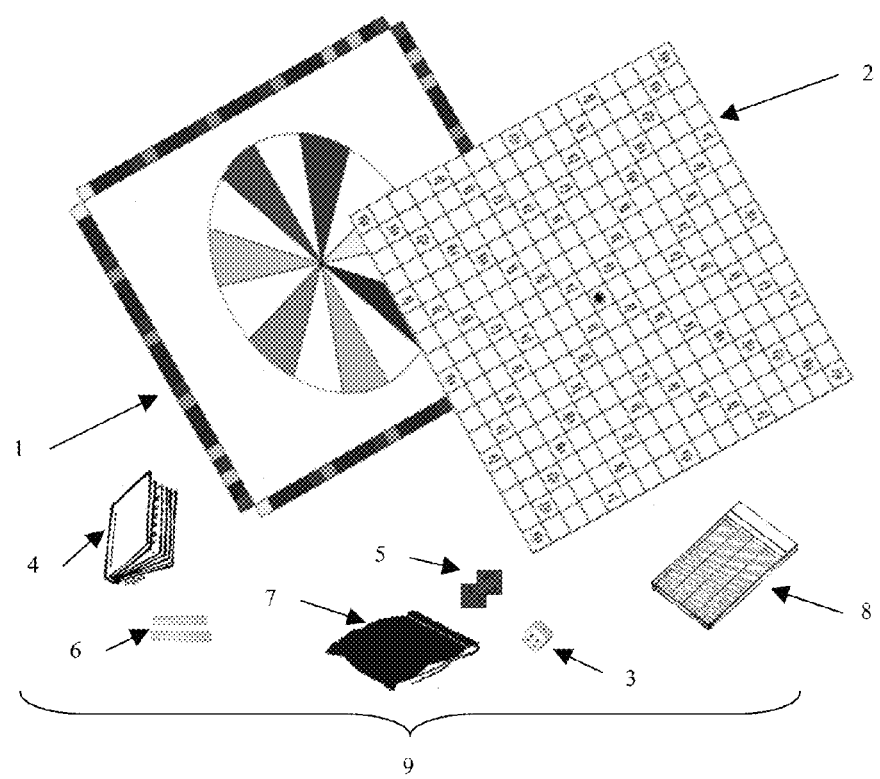
FIG. 1 is a perspective view of an educational apparatus according to the present invention.
Figure 1:
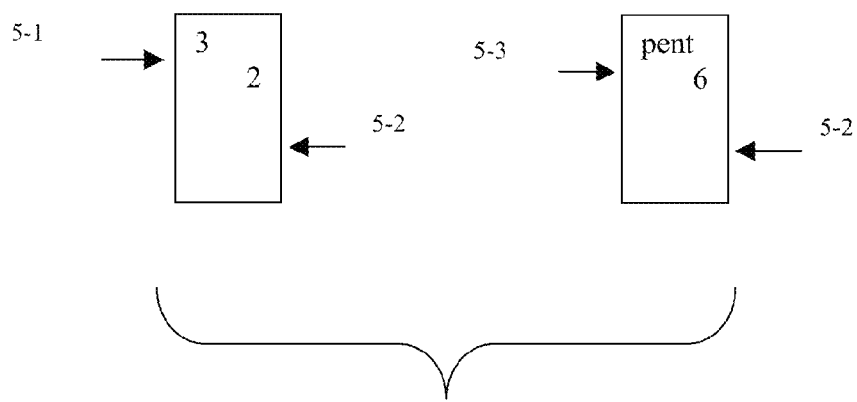

An object of the present invention is to provide an educational tool and method of use. In accordance with one aspect of the present invention, there is provided an educational apparatus comprising: a set of colored tiles having a front, wherein said front has indicia identified thereon, said indicia comprising a number or a text and a score; a plurality of colored tiles having a front, said front having indicia identified thereon, wherein said indicia is selected from the group comprising a number or a text and a score and wherein during use of the boards said playing pieces are arranged to form a correct name of a chemical compound is assigned to a particular user; and a using surface providing a mean for displaying said tiles such that a chemical name is visible. The board is played according to a using procedure.

Yet in accordance with another aspect of the invention, there is provided a method of using an educational tool comprising the steps of: providing an apparatus to a group of two of more individuals, said educational apparatus comprising a plurality of chemical compounds' names units in tiles format, two using surfaces; selecting, randomly, a predetermined number of tiles and positioning said tiles in relation to the using surface such that a correct name of a chemical compound is visible to the group of two or more individuals.

Yet in accordance with another aspect of the invention, an entertaining and educational apparatus is provided, comprising a first board and a second board. The first board, that is for beginners and intermediates has a plurality of colored spaces, each color stands for a concept in IUPAC nomenclature system. The second board that is for intermediates and advanced levels has 289 square spaces of equal dimensions some spaces contain premium score. The goal is to make a meaningful name from multiple colored tiles. The users makes a plurality of random draws of a certain number of the tiles (tiles having diverse colors) and attempting to form a meaningful name, places them on respective areas of the boards in relative positions that form a name. The order of users is determined by chance through rolling a dice. Except "✱" tile, each tile contains a number or a text that can be used in IUPAC nomenclature system, and a score. Scoring of a constructed name is based both on the scores written on the tiles and premium scores on the board.

This apparatus is also for learning the names of diseases, plants, animals, microbes, bacteria, cell components, biotechnology names and techniques, cell and molecular techniques, microbial pesticides, herbicides, drugs and similar cases in other branches of science.

Yet in accordance with another aspect of the invention, a method of using a chemical apparatus comprising training set including:

A first board including a square surface including a multi-colored path for tiles that is divided into a plurality of colored spaces arranged seriatim from left to right, that is for beginners and intermediates (1).

A second board including a using checkered surface including a starting point and some premium score spaces that are for intermediates and advanced levels. (2)

A number dice (3).

A guide booklet including a predetermined number of names, each name is related to an organic chemical (4).

A plurality of colored tiles (5), except ✱ tile each tile contains a number (5-1) or a text (5-3) that can be used in IUPAC nomenclature system, and a score (5-2). Tile being adapted to be placed on an is chromatic space on path in beginners' surface board.

Six racks for concealing personal tiles (6).

A bag for keeping tiles (7)

A score sheet (8).

Other applications include: the names of diseases, plants, animals, microbes, bacteria, cell components, biotechnology names and techniques, cell and molecular techniques, microbial pesticides, herbicides, drugs and similar cases in other branches of science.

Definitions

The term "IUPAC" stands for The International Union of Pure and Applied Chemistry that is the recognized authority in developing standards for the naming of the chemical elements and their compounds.

"✱", tile is one of the tiles that can be used in any positions or can be a replacement for any tile.

Description

The number, text or symbol can be placed on the tile by any conventional means, such as by printing, pressing, inscribing, or carving such on the tile or by pouring of a mould. The number, symbol or texts can be flat, raised, depressed or painted.

The tiles are colored and can be made of any suitable stiff material, such as wood including pressed wood, laminated wood, paper including recycled paper, or cardboard, or metal, or alloy, or glass, or ceramic, or clay, or synthetic materials, such as plastic, or shells, or animal bone and the like.

DETAILED DESCRIPTION OF THE INVENTION

Referring to FIG. 1, the present invention comprises an entertaining and educational method and its attached apparatus (9), which, in a preferred embodiment, includes a plurality of colored tiles (5), a number dice (3), score sheet (8), concealing racks (6), a guide booklet (4) and at least a board (1) or (2).

In beginners and lower intermediates' board, each cell and color of the board indicates one of the means, which is defined in IUPAC nomenclature system. Therefore, when one tile is chosen from different colures and is set with the similar color on the board, it becomes possible to make a meaningful name of a chemical compound.

Figure 2:
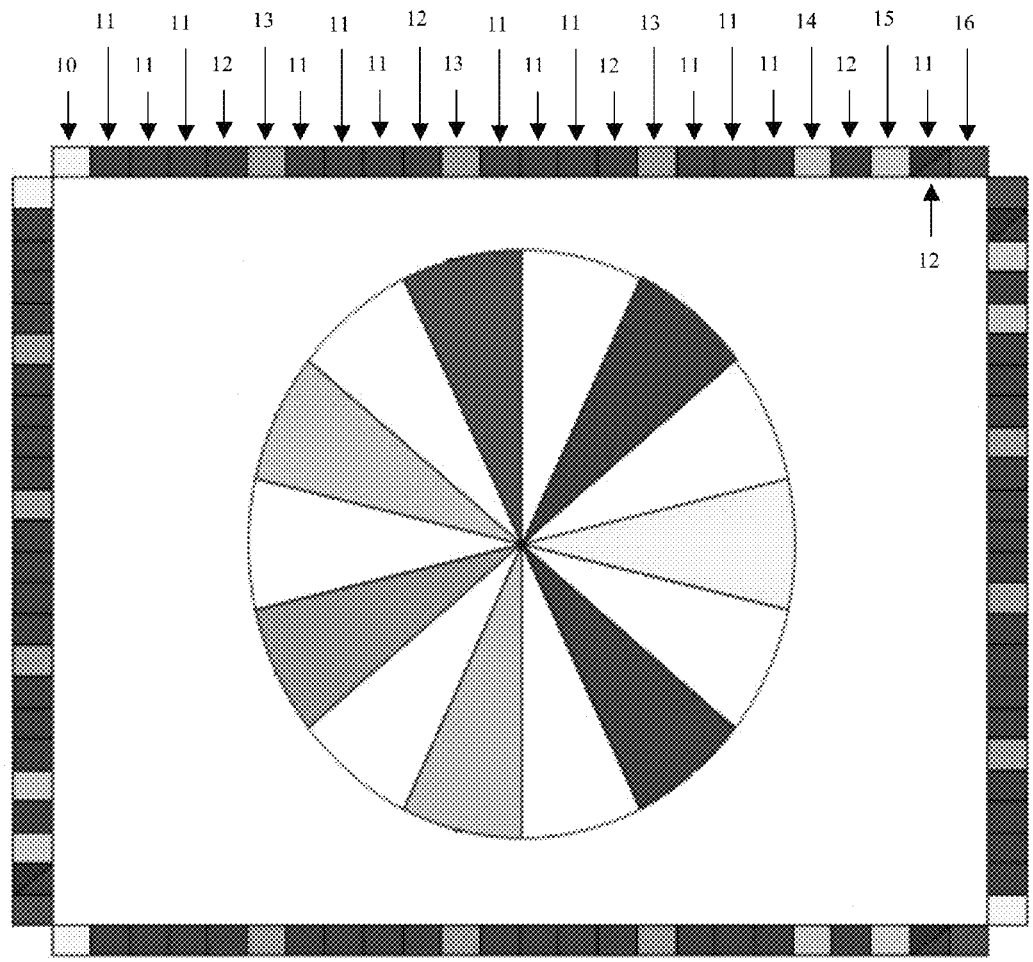
FIG. 2 is a top plan view of the beginners and lower intermediates board.

Each side of this board has 24 colored cells with a meaningful pattern that is displayed in FIG. 2). Order placement of colors in each side is in this manner: yellow (10), red, red, red (11), violet (12), blue (13), red, red, red (11), violet (12), blue (13), red, red, red (11), violet (12), blue (13), red, red, red (11), green (14), violet (12), orange (15), red-violet (11-12) and brown (16).

The guide for the board colors is as follows:
  Yellow: the kind of geometric isomers (cis or trans)
  Red: the position of side-chains/bonds and functional groups.
  Violet: the numbers of side-chains/bonds and functional groups.
  Blue: name of the side chain.
  Green: name of the parent chain.
  Orange: suffix for bond's type.
  Brown: suffix for functional group.

Method of Using the Beginners and Lower Intermediates' Board FIG. 2:
  Starting Steps:
  1. Write the names of each student on a sheet of paper called "score sheet" (8).
  2. Put all the tiles in the bag (7) provided and mix them up.
  3. The roll of the dice (3) is taken by each of the students and the one with the highest score begins. If two or more students have the same score, the process of rolling the dice is repeated for these students until the students with the least score are eliminated.
  4. The first individual user draws eight tiles (5) from tile bag and puts them on their own rack (6), and then passes the bag to the others to select their tiles.

The Rule of Using this Board:
  1. The first person combines two or more tiles to make a significant name of an organic compound and places them on the cells of the same color on the table.
  2. After the starter completed his turn, others follow in the same manner.
  Note:
    a. Each name must read from left to right.
    b. Meaningless and incomplete names are not allowed. The user can consult with the guide booklet for correct names.
  3. Each student must calculate his score and write it on the score sheet after s/he has completed his or her turn.
  Note:
    The score of each turn is obtained by adding the value of each tile used to form the name of compound.
  4. The number of tiles on the rack should always be eight. It means that participants must draw the same number of tiles used in the previous turn from the bag, thereby maintaining eight tiles on the rack, ready for the next turn.

The Last Steps:
  1. Training will terminate when all tiles in the bag have been drawn or when all the participants are unable to make any additional name from tiles on their rack.
  2. The score of tiles remaining on the rack must be deducted from the total score of the student.
  3. The individual who has the highest score is the most successful in training and who is the winner.

Figure 4:
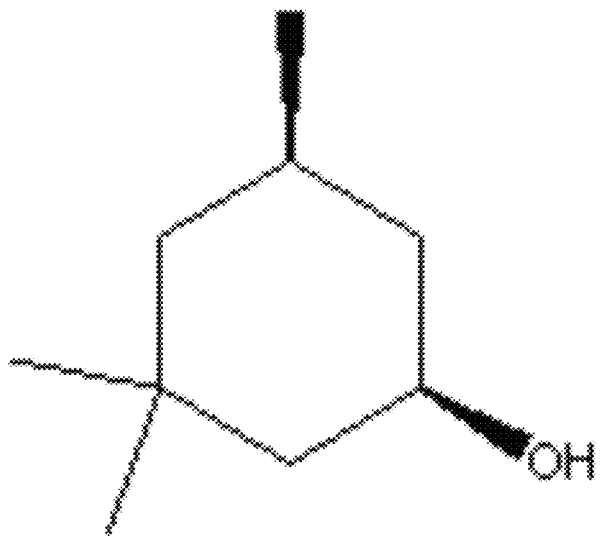
FIG. 4 is a view of a chemical structure.

Other Rules:

1. "✱" Tile: Participants can use "✱" tile as any tiles during their turns and help to make a correct name.
  2. Dual text tiles: Participants can use different texts on these tiles and it is depended on the correctness of the meaning of intended names to make.
  Example:
    For naming the structure that is seen in FIG. 4 and called cis-3,3,5-three methyl cyclohexanol, students or participants should place the relevant tiles on the similar color on the table respectively from left to right to make the above name, as shown in FIG. 5. These tiles are yellow, red, red, red, violet, Blue, green, orange and brown respectively from left to right.

Note: Sometimes Buta, Penta . . . terms should be used in the green cells. Such tiles are not made available, since it would be easier. In this case the green tiles called But, Pent . . . will be useful.

Method of Using the Intermediates and Advanced Level Boards FIG. 3:

Referring to FIG. 3 this board has 289 square spaces of equal dimensions, some spaces contain premium score. As showing in FIG. 3-1 These premium scores are included double tile score (17), triple tile score (18), double compound score (19) and triple compound score (20).

Starting Steps:
  1. Write the names of each student on a sheet of paper called "score sheet" (8).
  2. Put all the tiles in the bag (7) provided and mix them up.
  3. The roll of the dice (3) is taken by each of the students and the one with the highest score begins. If two or more students have the same score, the process of rolling the dice is repeated for these students until the students with the least score are eliminated.
  4. The first user draws eight tiles (5) from tile bag and puts them on their own rack (6), and then passes the bag to the others to select their tiles.

The Rule of Using this Board:
1. The first person combines two or more tiles to make a significant name of an organic compound and places them on the board provided.
2. After the starter completed his turn, each participant in turn then places one or more tile on the board to form another name. All names formed must interconnect with another name on the board.
   Note:
   a. Each name can read either from right to left or vice versa, top to bottom or vice versa.
   b. Meaningless, incomplete and diagonal names are not allowed.
3. Each participant must calculate his score and write it on the score sheet after he has completed his turn.
   Note:
   See scoring section for more details.
4. The number of tiles on the rack should always be eight. It means that participants must draw the same number of tiles used in the previous turn from the bag, thereby maintaining eight tiles on the rack, ready for the next turn.

The Last Steps:
1. Training will terminate when all tiles in the bag have been drawn or when all the participants are unable to make any additional name from tiles on their rack.
2. The score of tiles remaining on the rack must be deducted from the total score of the student.
3. The individual who has the highest score is the most successful in training and who is the winner.

Figure 6:
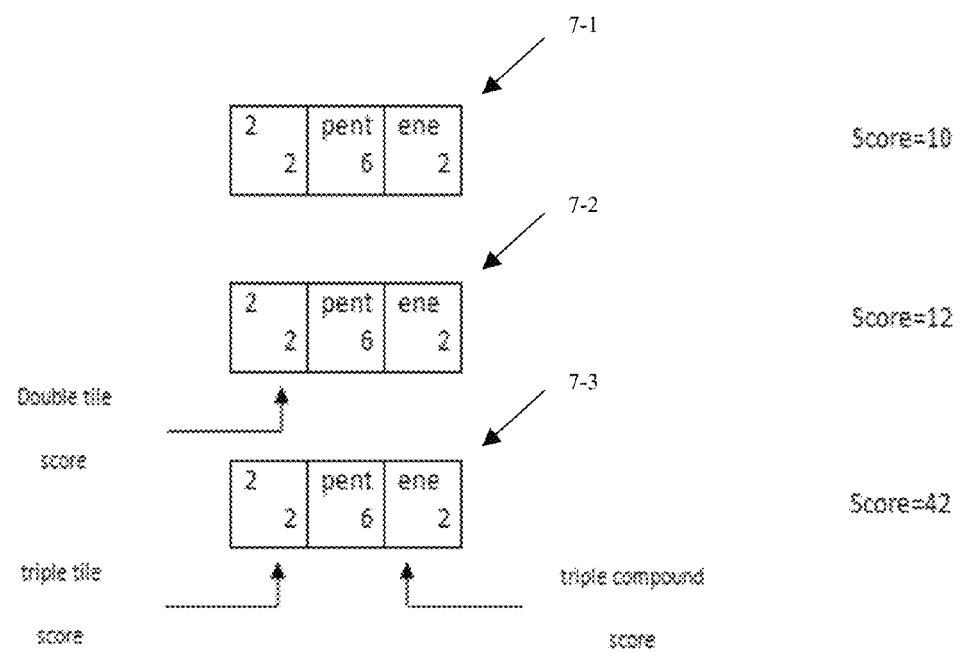
FIG. 6 showing an example of tiles' placement on the board that makes a compound's name and the score that awards each compound according to premium scores.

Scoring:
1. The score of each name is the total value of all the tiles used in the name then multiplied by the premium score.
   Example:
   As shown in FIG. 6. Score in the first row (6-1) is 10 because sum total of 2, 6 and 2 is 10. In the second row (6-2), score is 12 because one tile is situated in a premium score that is "double tile score" and the score of this tile is double. In the third row (6-3) because one tile is in "triple tile score" and another one is in "triple compound score", total score is 42.
2. If two names are formed and there is a common tile placed on a premium score, both new names use the premium score.

Figure 8A:
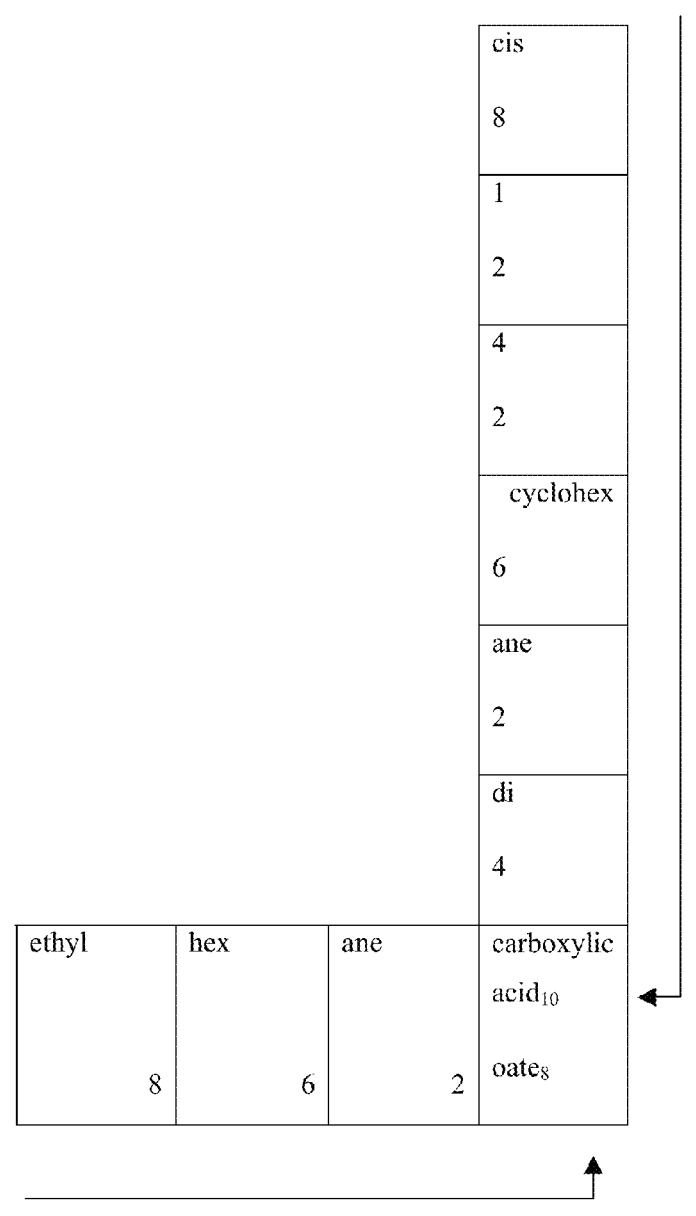
Figure 8B:
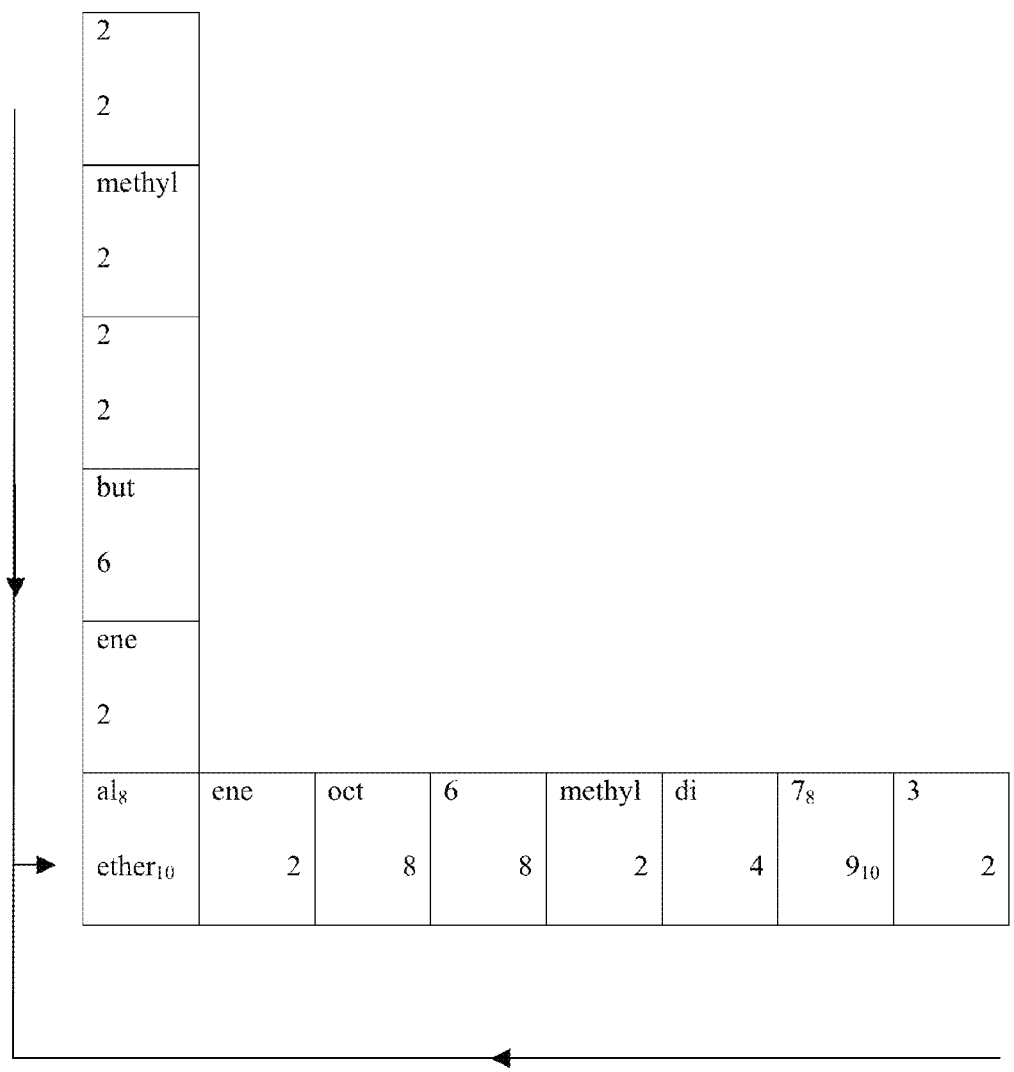
FIG. 8 is a view of some tiles arranged on the board that have made two compound names.

Other Rules:
1. A participant may make a new name on the board by adding one or more tiles before the first tile of the made name or after the last tile of the made name or both before and after the tiles of the made name before and add the total score of this name to his score.
   Example:
   Changing 2-pentene to 4-methyl-2-pentenoic acid.
2. Participants can also use only some of the first and last tiles of the made name to make a new one.
   Example:
   As shown in FIG. 7, 2-methoxy-1-propene that are a name for a compound and are called from left to right are on the board. Since, the names can read both from left to right and right to left, another participant can use only the first three tiles of this name to make another one in the opposite direction, and make 1-methoxy-2-methyl benzene.
3. Dual text tiles: As shown in FIG. 8, The participants may use different texts on these tiles for both vertical and horizontal names (8-1) or same text for both vertical and horizontal names at the same time (8-2) and it depends on the correctness of the meaning of intended names to make.
4. "✱" Tile: Students or participant can use "✱" tile as any tiles during their turns and help to make a correct name.
5. Students can change a tile with each other without seeing them, if there is not any tile left in the bag and the students cannot make a new name with their own tiles.
6. In cases that participant cannot make a new name by their eight tiles, they can draw up to 12 tiles if there are some tiles left in the bag.
7. A person who makes an incorrect name has to withdraw his tiles and move them to his own rack. So he loses a turn.

The invention has been described in connection with its preferred embodiments. However, it is not limited thereto. Changes, variations and modifications to the basic design may be made without departing from the inventive concepts in this invention. In addition, these changes, variations and modifications would be obvious to those skilled in the art having the benefit of the foregoing teachings. All such changes, variations and modifications are intended to be within the scope of the invention, which is limited only by the following claims.

We claim:

1. A learning aid method for a plurality of individuals to learn combinations of at least one sub-component of at least one chemical substance nomenclature, comprising the steps of:
   providing a first board and a second board, where each board comprises indicia including a plurality of spaces;
   providing a tile container and a plurality of tiles, where each tile comprises text or number indicia representing a sub-component of a chemical substance nomenclature and a number indicia representing a score;
   selecting one of the boards to use during game play;
   throwing a die to identify the order of play;
   picking a plurality of tiles from the tile container by each player;
   placing in turn by each player a plurality of said player tiles on said spaces of said selected board such that the tiles form a complete and correct name of a chemical compound; and
   awarding a predetermined score to each player based on both the score indicia on the tiles and the indicia on the board on which the tiles are placed.

2. The method of claim 1, wherein said first board comprises a plurality of squares with predetermined colors corresponding to a plurality of colored tiles.

3. The method of claim 1, wherein said second board comprises a plurality of square spaces of equal dimensions, wherein at least one of said plurality of square spaces contains indicia representing a premium score.

4. The method of claim 1, wherein said premium score comprises a double tile score, triple tile score, double compound score, or triple compound score.

5. The method of claim 1, wherein said first board is for beginners and intermediate players and has a plurality of colored spaces where each color stands for a concept in IUPAC nomenclature system and said second board is for intermediate and advanced players and has 289 square spaces of equal dimensions, wherein some spaces contain indicia representing a premium score.

* * * * *